United States Patent
Lee et al.

(10) Patent No.: US 7,095,204 B2
(45) Date of Patent: Aug. 22, 2006

(54) STARTUP CONTROL METHOD OF BRUSHLESS DC MOTOR

(75) Inventors: Kwang Woon Lee, Suwon-Si (KR); Dae Kyong Kim, Ansan-Si (KR); Sang Taek Lee, Seoul (KR); Hyen Young Choi, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/183,956

(22) Filed: Jul. 19, 2005

(65) Prior Publication Data

US 2006/0132075 A1 Jun. 22, 2006

(30) Foreign Application Priority Data

Dec. 17, 2004 (KR) .................... 10-2004-0108214

(51) Int. Cl.
*H02P 1/46* (2006.01)
(52) U.S. Cl. .................... 318/700; 318/721; 318/723
(58) Field of Classification Search ............. 318/138, 318/700, 245, 254, 439, 811, 721, 723
See application file for complete search history.

(56) References Cited

U.S. PATENT DOCUMENTS

| | | | |
|---|---|---|---|
| 4,511,827 A | 4/1985 | Morinaga et al. | |
| 5,350,984 A | 9/1994 | Carobolante et al. | |
| 5,783,917 A * | 7/1998 | Takekawa | 318/439 |
| 5,789,895 A * | 8/1998 | Lee | 318/811 |
| 5,859,520 A | 1/1999 | Bourgeois et al. | |
| 6,163,119 A * | 12/2000 | Jeong | 318/254 |
| 6,462,492 B1 * | 10/2002 | Sakamoto et al. | 318/254 |
| 6,483,266 B1 * | 11/2002 | Miyazaki et al. | 318/254 |
| 6,483,270 B1 * | 11/2002 | Miyazaki et al. | 318/700 |
| 6,570,351 B1 * | 5/2003 | Miyazaki et al. | 318/254 |
| 6,639,377 B1 * | 10/2003 | Iwaji et al. | 318/700 |
| 2002/0050800 A1 * | 5/2002 | Miyazaki et al. | 318/254 |
| 2002/0153857 A1 * | 10/2002 | Iwaji et al. | 318/700 |
| 2002/0171381 A1 * | 11/2002 | Miyazaki et al. | 318/254 |
| 2003/0062860 A1 * | 4/2003 | Wu et al. | 318/254 |

FOREIGN PATENT DOCUMENTS

| | | | |
|---|---|---|---|
| JP | 10210787 A | * | 8/1998 |
| KR | 10-0431287 | | 2/2003 |

* cited by examiner

*Primary Examiner*—Paul Ip
(74) *Attorney, Agent, or Firm*—Staas & Halsey LLP

(57) ABSTRACT

A startup control method of a BLDC motor is disclosed. The method can control the BLDC motor to prevent the generation of a transient current such that the vibration of the BLDC motor can be reduced at the startup stage and perform a stable conversion into a sensorless operation mode such that the startup failure rate of the BLDC motor can be reduced. The startup control method includes commutating a current applied to stator windings according to a rotor position. The method of operating the BLDC motor includes a rotor position that is forcibly aligned and so that phase commutation is performed, a back-electromotive force (back-emf) is detected from a lead voltage of a phase of a voltage which is not applied thereto after performing phase commutation and a determination is performed as to whether the detected back-emf is in a rising interval. The lead voltage of the phase of the voltage which is not applied thereto is integrated, such that if the back-emf is in a rising interval and if an instance that the integration result is greater than a predetermined value a phase commutation time point is set and conversion into a sensorless operation mode is performed if the back-emf detected from the lead voltage is in a stable interval, based on a frequency of the voltage applied to the stator winding.

15 Claims, 12 Drawing Sheets

(PRIOR ART)

STARTUP CONTROL METHOD OF BRUSHLESS DC MOTOR

CROSS-REFERENCE TO RELATED APPLICATIONS

This application claims the benefit of Korean Patent Application No. 2004-108214, filed on Dec. 17, 2004 in the Korean Intellectual Property Office, the disclosure of which is incorporated herein by reference.

BACKGROUND OF THE INVENTION

1. Field of the Invention

The present invention relates to a senseless startup control technique of a brushless direct current motor (hereinafter referred to as BLDC motor), and, more particularly, to a method that is capable of controlling a BLDC motor to prevent the generation of transient current in its startup stage.

2. Description of the Related Art

Generally, a BLDC motor includes a stator as an armature inducing electromotive force (emf) by a current-carrying coil thereof, and a rotor as a permanent magnet having N-S poles, in which the rotor is rotated with respect to the stator. It is necessary to form continuous rotating magnetic field of the BLDC motor such that the BLDC motor can be successively operated. Phase commutation of current flowing through each of windings is performed at a proper time to form a continuous rotating magnetic field, which can be achieved as a rotor position is correctly recognized. Here, the term "commutation" means to change the direction of current flowing through the windings of the stator such that the rotor can be rotated with respect to the stator.

To smoothly operate the BLDC motor, the rotor position is accurately consistent with the commutation time point of the phase current, which requires a device for detecting the rotor position. Although the device employs a position sensor, such as a Hall sensor, a Resolver sensor, and an encoder, the position sensor causes problems such as an increase of manufacturing cost of the BLDC motor, complication of driving circuits, etc. To resolve such problems, a method for detecting rotor position using electric circuits is researched.

Thus, an electric circuit for detecting rotor position is developed using back-emf of a BLDC motor. As such, the BLDC motor is operated by the rotor position that is detected by an electric circuit, instead of a position sensor. Hence, it said that "the motor is operated in a sensorless operation mode."

Before a BLDC motor is operated in a senseless operation mode, it must pass through a startup stage, which will be described below with reference to FIGS. 1 and 2.

In FIG. 1, current is supplied to two phases of the BLDC motor (for example, if the BLDC motor has three phases) such that a rotor is forcibly aligned as illustrated in operation 1. At operation 2, after completing the alignment of the rotor, the amplitude and frequency of the voltage applied to the BLDC motor are varied such that the rotation speed of the rotor of the BLDC motor can be forcibly accelerated to reach a predetermined speed, as shown in FIG. 2, in operation 2. At operation 3, when the rotation speed of the rotor reaches the predetermined speed such that back-emf can be detected from the stator winding of the BLDC motor, the voltage supplied to the BLDC motor is controlled such that magnetic field phases of the rotor and the stator are adjusted. After that, at operation 4, the present operation mode of the BLDC motor is converted into a sensorless operation mode such that phase commutation and speed control of the BLDC motor are performed to run the BLDC motor, based on position information of the rotor, in which the position information is indirectly detected from back-emf information of the BLDC motor.

However, the conventional sensorless operation control method of the BLDC motor requires position information of the rotor to drive the BLDC motor. If a voltage is supplied to a stator winding in a state wherein position information of the rotor is not recognized, a transient current is generated. The transient current causes the generation of relatively large torque pulsation and the demagnetization of a permanent magnet of the rotor.

Also, since a voltage with a specific frequency pattern is applied to the BLDC motor regardless of the substantial position of the rotor before the BLDC motor is converted into the sensorless operation mode, the transient current causes the generation of torque pulsation and the demagnetization of a permanent magnet. Furthermore, the excessive torque pulsation may cause failure of conversion of the sensorless operation mode.

To resolve the above mentioned problems, U.S. Pat. No. 5,859,520 discloses that a lead voltage of the BLDC motor is detected to be compared with a voltage of '0,' and a zero crossing point (ZCP) of back-emf thereof is detected. After that, the BLDC motor is delayed by a time corresponding to one-half of the average ZCP detection time of the back-emf to perform phase commutation.

According to a method disclosed in U.S. Pat. No. 5,859,520, only the switching elements of the inverter are controlled by a PWM, and a lead voltage of a phase to which a voltage is not applied is compared with a voltage of '0' to detect a ZCP of back-emf. After that, the BLDC motor is delayed by a time corresponding to one-half of the average detection time point of the ZCP of the back-emf to perform phase commutation. Similar to the descriptions of FIGS. 1 and 2, the BLDC motor must be synchronously accelerated until a ZCP of the back-emf can be detected.

However, the conventional method has disadvantages in that, since the BLDC motor must be synchronously accelerated until the ZCP of the back-emf can be detected, it has a high possibility that a transient current can be generated. Also, the conventional method has drawbacks in that, when the BLDC motor is delayed by a time corresponding to one-half of the average detection time point of a ZCP of a back-emf to perform phase commutation, a system generating large load variation at a very low speed, such as a compressor, cannot perform phase commutation at a correct phase commutation time point. Therefore, in the conventional methods, there is a high possibility that a transient current can be generated.

Furthermore, IEEE ("Four-quadrant sensorless brushless ECM drive", 10–15 Mar., 1991) discloses a startup control method of a senseless BLDC motor that is capable of integrating back-emf, comparing the integration result with a specific voltage level, and then performing phase commutation based on the comparison. However, since the conventional methods must synchronously accelerate the BLDC motor until a back-emf can be detected, there is a high possibility that a transient current can be generated at a startup of the BLDC motor.

SUMMARY OF THE INVENTION

Additional aspects and/or advantages of the invention will be set forth in part in the description which follows and, in part, will be apparent from the description, or may be learned by practice of the invention.

Accordingly, it is an aspect of the present invention to provide a startup control method of a brushless DC (BLDC) motor which is capable of restricting a transient current generated at a startup stage, such that vibration of the BLDC motor that is generated at the startup stage of the BLDC motor, can be reduced.

It is another aspect of the present invention to provide a startup control method of a BLDC motor which is capable of restricting a transient current generated at a startup stage, and performing stable conversion of a present operation mode into a sensorless operation mode, such that startup failure rate of the BLDC motor can be reduced.

The above aspects of the present invention are achieved by providing a startup control method of a brushless direct current (BLDC) motor by commutating a current applied to stator windings according to a rotor position. The method includes performing phase commutation while the BLDC motor is synchronously accelerated detecting back-electromotive force (back-emf) from a lead voltage of a phase to which a voltage does not apply after performing the phase commutation determining whether the detected back-emf is in a rising interval, and setting a commutation time point and converting into a sensorless operation mode if the back-emf detected from the lead voltage is in a stable interval, based on a frequency of the voltage applied to the stator windings from the determined phase commutation time point.

The method may further include integrating the lead voltage of the phase to which the voltage does not apply if the back-emf is in the rising interval, and setting a time point that the integration result is greater than a predetermined value as a phase commutation time point.

The integration result of the lead voltage may be an A/D conversion value of a lead voltage signal of the phase to which the voltage does not apply in a PWM OFF interval.

The method may further include setting a time point that a phase current value is greater than a predetermined value, as a phase commutation time point, if the back-emf is in a falling interval.

The phase current value may be an A/D conversion value of a current detection signal of current phase in a PWM ON interval.

The method may further include detecting back-emf from the lead voltage of the phase to which the voltage does not apply based on the phase commutation, if the back-emf detected from the lead voltage is not in a stable interval, and returning to the determination of whether the detected back-emf is in the rising interval.

The commutation may further include performing phase commutation, detecting a zero crossing point (ZCP) of the back-emf from each lead voltage, and performing the sensorless operation mode based on ZCP information, wherein the sensorless operation includes a phase commutation and speed control.

The method may further include supplying current to any two phases of the stator windings, and forcibly aligning the rotor position.

The above aspects of the present invention are achieved by providing a startup control method for controlling a startup of a brushless direct current (BLDC) motor by commutating a current applied to stator windings according to a rotor position. The method includes forcibly aligning the rotor position, and performing phase commutation, detecting back-electromotive force (back-emf) from a lead voltage of a phase of a voltage which is not applied thereto after performing the phase commutation, and determining whether the detected back-emf is in a rising interval, integrating the lead voltage of the phase of the voltage which is not applied thereto if the back-emf is in a rising interval, and setting a time point that the integration result is greater than a predetermined value as a phase commutation time point, setting a time point that a phase current value is greater than a predetermined value as a phase commutation time point if the back-emf is in a falling interval, and converting to a sensorless operation mode if the back-emf detected from the lead voltage is in a stable interval, based on a frequency of the voltage applied to the stator windings.

The above aspects of the present invention are further achieved by providing a startup control method of a brushless direct current (BLDC) motor by commutating a current applied to stator windings according to a rotor position, including detecting back-electromotive force (back-emf) from a lead voltage of a phase of a voltage which is not applied thereto after performing the phase commutation, and determining whether the detected back-emf is in a rising interval, setting a time point that a phase current value is greater than a predetermined value as a phase commutation time point if the back-emf is in a falling interval, and converting the commutation time point to a sensorless operation mode if the back-emf detected from the lead voltage is in a stable interval based on a frequency of the voltage applied to the stator windings.

The above aspects of the present invention are further achieved by providing a startup control method for controlling startup of a brushless direct current (BLDC) motor including commutating a current applied to stator windings according to a rotor position, forcibly aligning the rotor position and performing phase commutation, detecting back-electromotive force (back-emf) from a lead voltage of a phase of a voltage which is not applied thereto after performing the phase commutation, and determining whether the detected back-emf is in a rising interval, determining phase commutation time point based on current waveform, and converting to a senseless operation mode if the back-emf detected from the lead voltage is in a stable interval, based on a frequency of the voltage applied to the stator windings.

The above aspects of the present invention are further achieved by providing a startup control method for controlling startup of a brushless direct current (BLDC) motor by commutating a current applied to stator windings according to a rotor position, including performing phase commutation, detecting a zero crossing point (ZCP) of the back-emf from each lead voltage, and performing a sensorless operation mode based on ZCP information, wherein the sensorless operation includes a phase commutation and speed control.

The above aspects of the present invention are further achieved by providing a startup control apparatus including a sensorless driving device including a rectifying unit to rectify and smooth an AC power supply, an inverter to convert the DC power from the rectifying unit into AC power having a plurality of phases, a lead voltage detection unit to detect a lead voltage of each of the plurality of phases, a current detection unit to detect current of the DC source supplied to the inverter from the rectifying unit, a controlling unit to detect a zero crossing point of back-emf according to the lead voltage of the each of the plurality of phases, and a PWM signal generation unit to PWM signals based on the output of the controlling unit to supply said PWM signals to the inverter, wherein a converting unit converts a commutation time point to a sensorless operation mode if the back-emf detected from the lead voltage is in a stable interval based on a frequency of the voltage applied to the stator windings.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
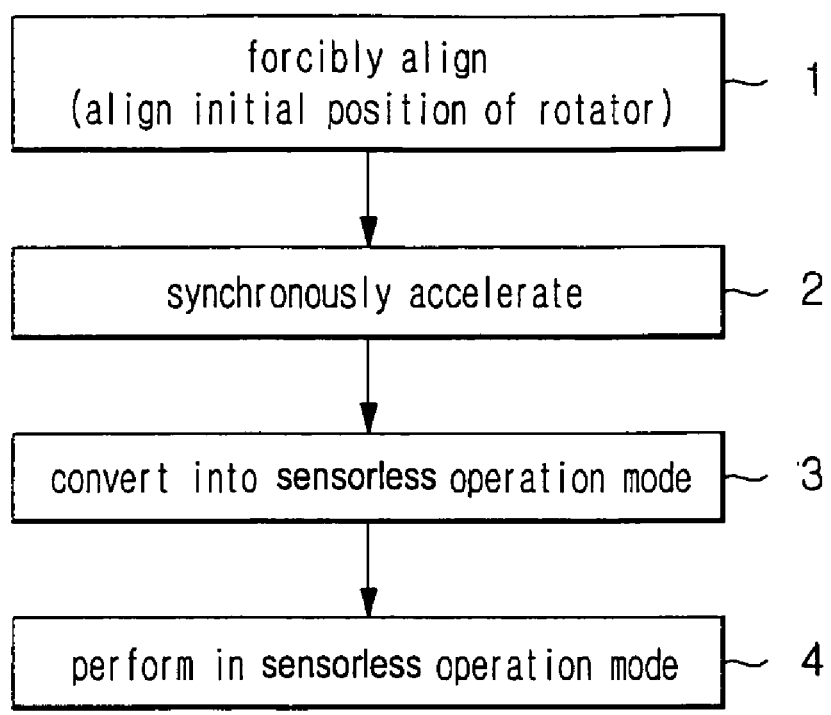
FIG. 1 is a flowchart illustrating a conventional senseless operation control of a general BLDC motor.
Figure 2:
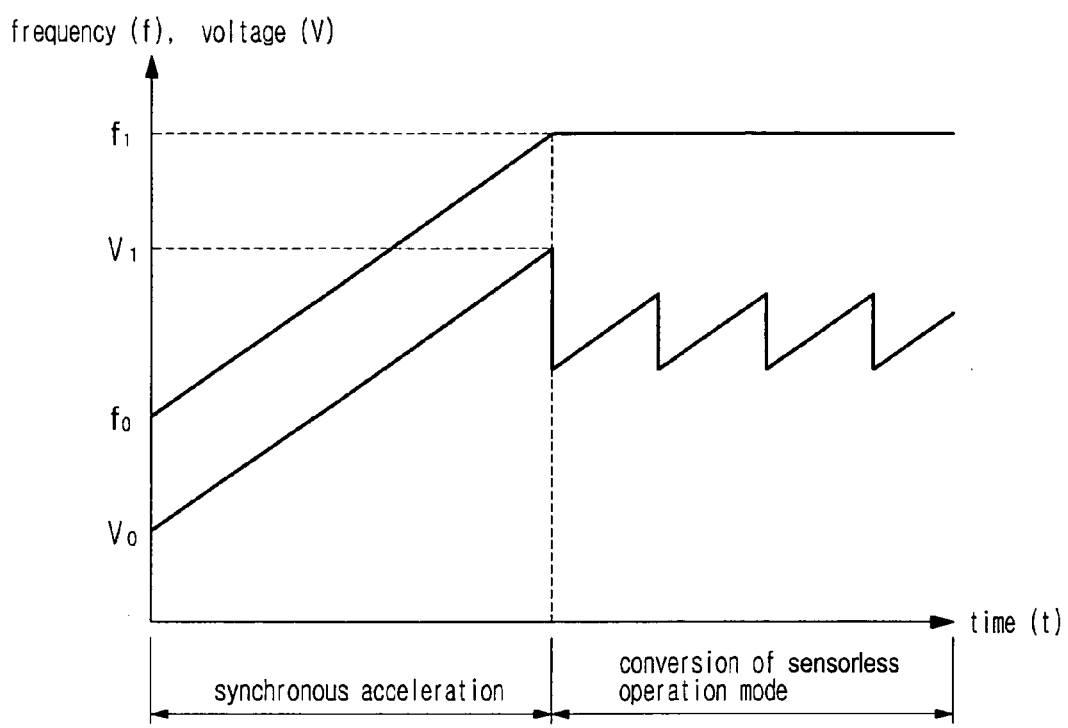
FIG. 2 is a view illustrating a conventional input pattern in a synchronous acceleration stage and conversion stage into a sensorless operation mode of a general BLDC motor.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
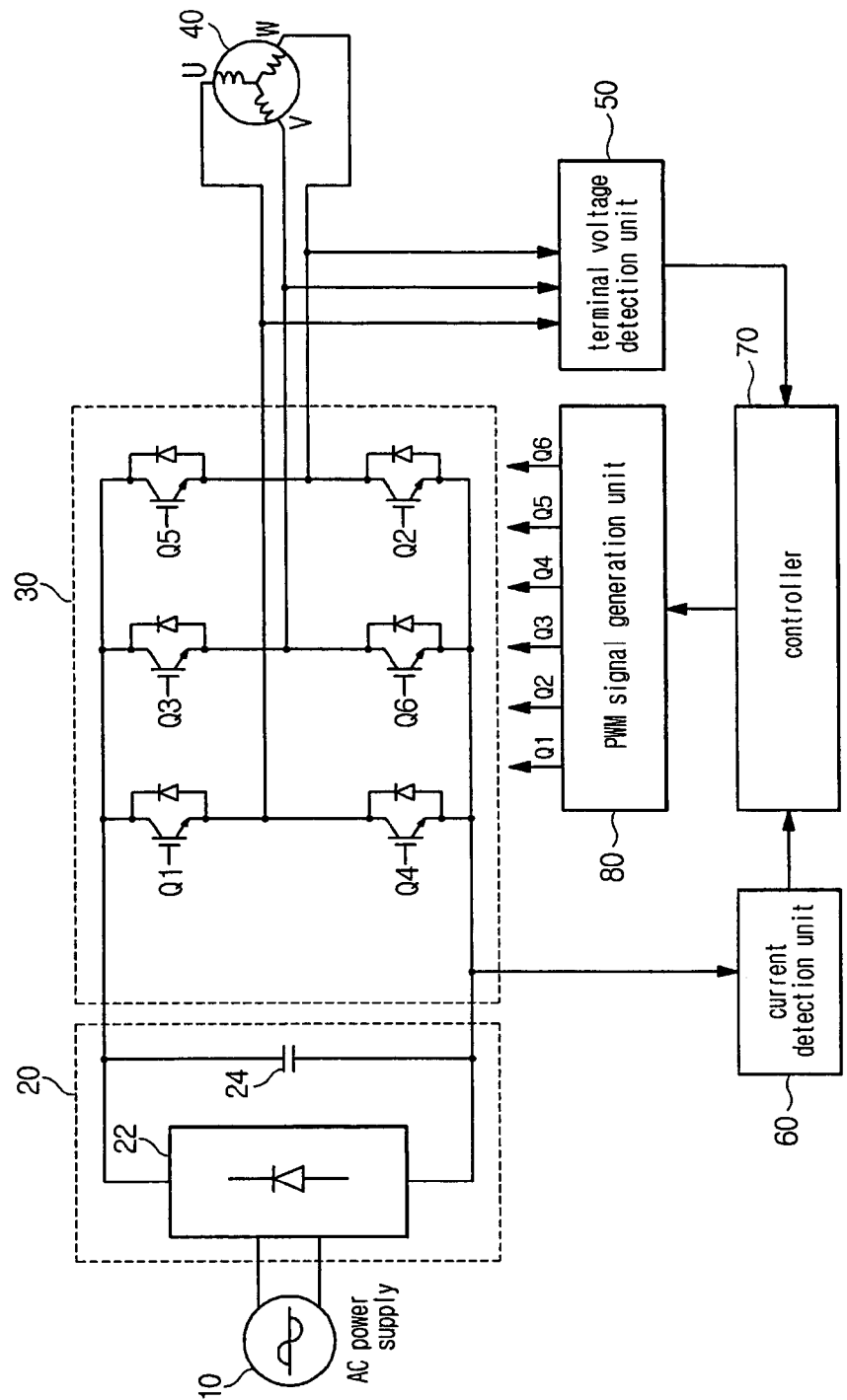
FIG. 3 is a schematic block diagram illustrating a sensorless driving device of a BLDC motor according to a first embodiment of the present invention.

FIG. 3 is a schematic block diagram illustrating a sensorless driving device of a BLDC motor according to a first embodiment of the present invention.

As shown in FIG. 3, the sensorless driving device includes a rectifying unit 20, an inverter 30, a lead voltage detection unit 50, a current detection unit 60, a controlling unit 70 and a PWM signal generation unit 80.

The rectifying unit 20 rectifies and smoothes AC power 10 to supply DC power to the inverter 30. The smooth rectifying unit 20 includes a rectifier 22 and a smoothing capacitor 24.

The inverter 30 converts the DC power from the rectifying unit 20 into AC power having three-phases, U, V and W with a variable frequency, in which the AC power is shaped as a pulse, and then supplies the three-phase power to the BLDC motor 40. The inverter 30 is a kind of switching circuit, including six switching elements Q1 to Q6 and diodes.

The lead voltage detection unit 50 detects a lead voltage of each of phases U, V and W from the three-phase current source to input it to the controlling unit 70. The current detection unit 60 detects current of the DC source supplied to the inverter 30 from the rectifying unit 20, and inputs it to the controlling unit 70.

The controlling unit 70 detects a zero crossing point (ZCP) of back-emf according to the lead voltage of the respective phases U, V and W, which are detected in the lead voltage detection unit 50, obtains position information of the rotor based on the detection, and controls a time point of voltage applied to a stator winding according to current value detected in the current detection unit 60 and patterns of PWM signals supplied to the inverter 30 such that a transient current cannot be supplied to the BLDC motor 40. The controlling unit 70 performs an entire control algorithm of the inverter 30.

The PWM signal generation unit 80 generates PWM signals based on the output of the controlling unit 70 to supply them to the inverter 30.

Figure 4:
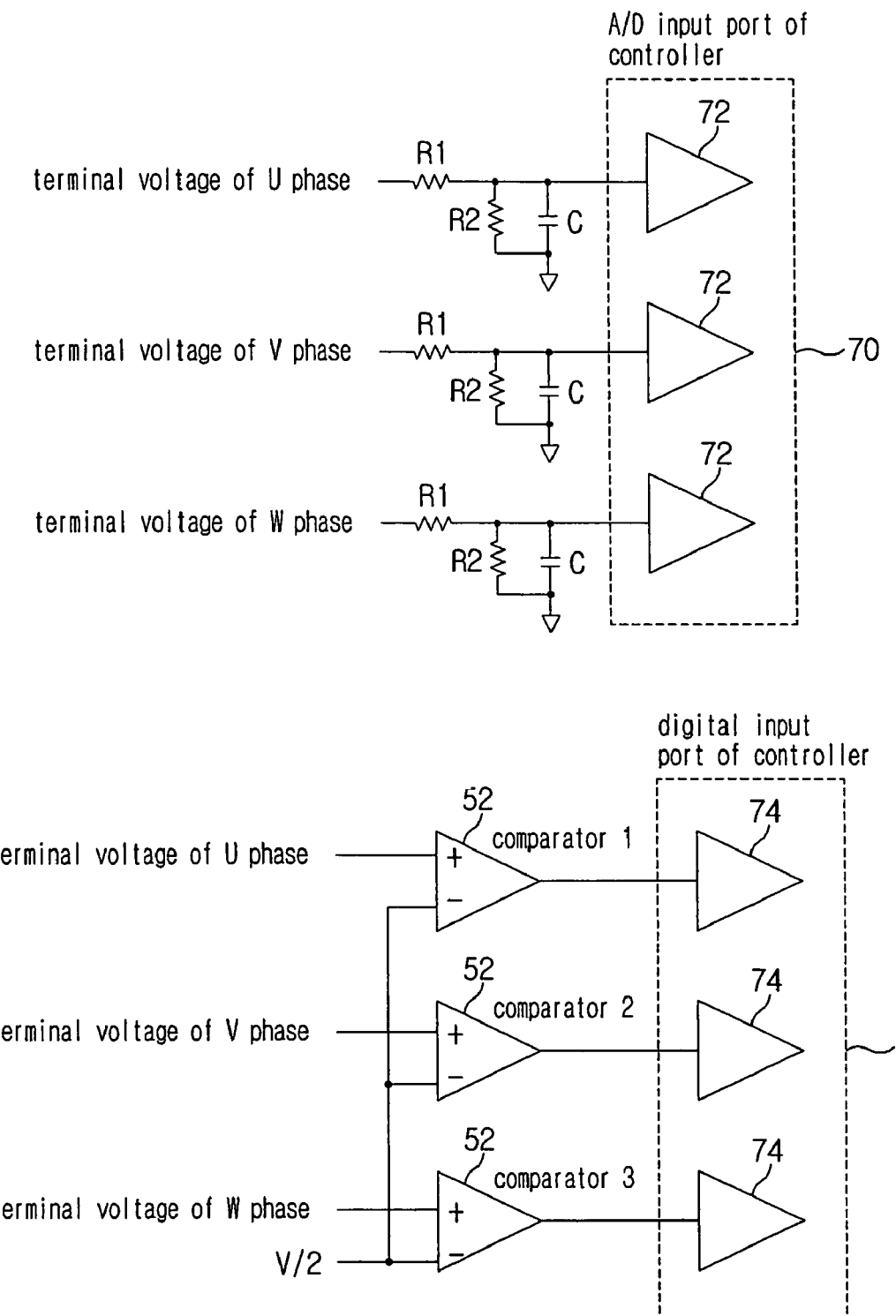
FIG. 4 is detailed views illustrating a lead voltage detection unit adapted to the present invention.

FIG. 4 is a detailed view illustrating a lead voltage detection unit adapted to the present invention.

In FIG. 4, the lead voltages of the respective phases U, V and W of the BLDC motor 40 are divided by resistors R1 and R2, which form a resistance dividing circuit that is inputted to the A/D input ports 72 of the controlling unit 70. Here, the resistance dividing circuit formed by R1 and R2 can be implemented to further add a Zener diode to the A/D input port 72 such that the divided voltage value is limited by the Zener diode to a predetermined range of the A/D input voltage of the respective lead voltages.

Also, in the sensorless operation interval, comparators 52 compare the lead voltage of the respective phases U, V and W with a half value of a DC lead voltage V of the inverter 30, in order to detect a ZCP of back-emf from the lead voltage of the respective phases, and the result based on the above comparison is inputted to the digital input port 74 of the controlling unit 70.

Figure 5A:
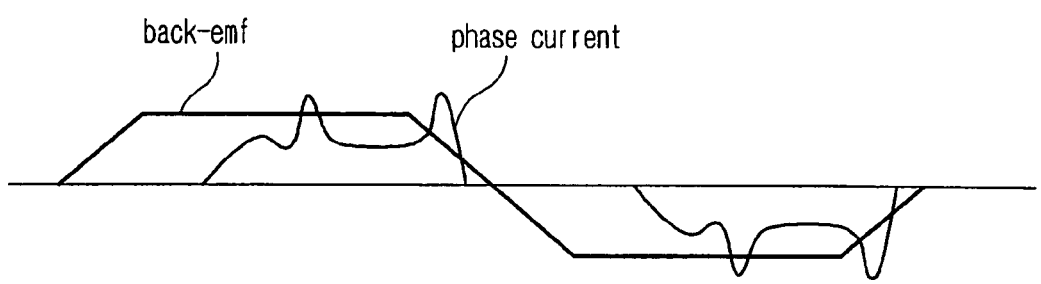
FIGS. 5a and 5b are current waveforms based on phase commutation time points of a rotor position and a stator winding according to the present invention.
Figure 5B:
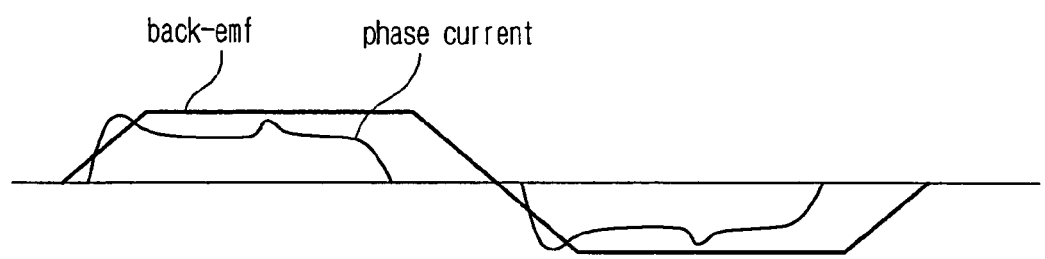

FIGS. 5a and 5b are current waveforms based on phase commutation time points of a rotor position and a stator winding according to the present invention. Namely, when a time point for phase commutation of a stator winding of the BLDC motor 40 is fast or slow, pulses are generated in the phase current waveform, as shown in FIGS. 5a and 5b.

The BLDC motor 40 operated in the sensorless operation mode inputs a voltage which is relatively larger than a proper voltage for loads installed to the BLDC motor 40 to reduce the startup failure rate of the BLDC motor. Therefore, in the interval wherein the BLDC motor 40 is synchronously accelerated, the time point for phase commutation of the stator winding is late as shown in FIG. 5A.

FIG. 5a is a current waveform when the time point of voltage supplied to a stator winding is late with respect to the rotor position, in which phases of the back-emf and the phase current are not consistent with each other. Also, the magnitude of the phase current is excessively increased at the rear part of the phase current.

FIG. 5b is a current waveform when the time point of the voltage supplied to a stator winding is late with respect to the rotor position, in which phases of the back-emf and the phase current are not consistent with each other. Also, the magnitude of the phase current is excessively increased at the front part of the phase current.

Figure 6:
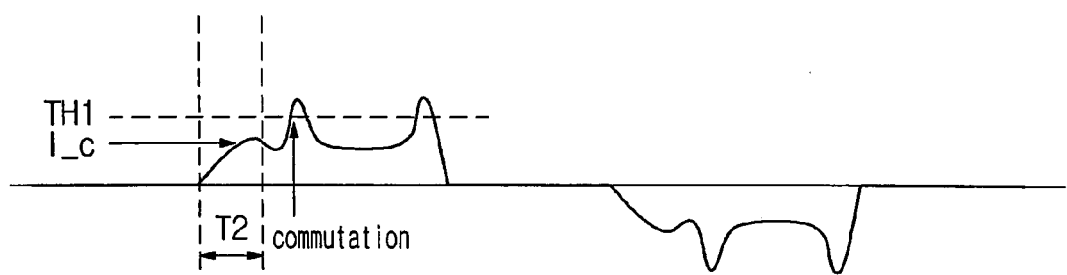
FIG. 6 is a view illustrating phase commutation time points in a current waveform according to the present invention.

FIG. 6 is a view illustrating phase commutation time points in a current waveform according to the present invention. Namely, FIG. 6 illustrates the variation of phase current with respect to the rotor position, according to time points of voltage applied to the stator winding.

As illustrated in FIG. 6, after a phase current is detected in a synchronous acceleration interval, if the detected current phase is greater than a predetermined current level TH1, phase commutation is performed such that a commutation time point of the stator winding can be a proper value.

Here, the predetermined current level TH1 is preferably set to 1.5 times a phase current 1_c right after performing phase commutation (TH1=1.5×I_c).

There is a limitation to acquire a time point for a proper phase commutation using only an algorithm for determining the time point of phase commutation based on the magnitude of the phase current. Namely, in a case that a time point of the phase commutation is late, if it is determined by only a phase current, the determined time point may be maintained in a delay state. Such a problem can be resolved as a back-emf is detected from a lead voltage of a phase to which a voltage is not applied (OFF phase), and the detection result is integrated to determine time point of phase commutation (see FIG. 9).

Figure 7:
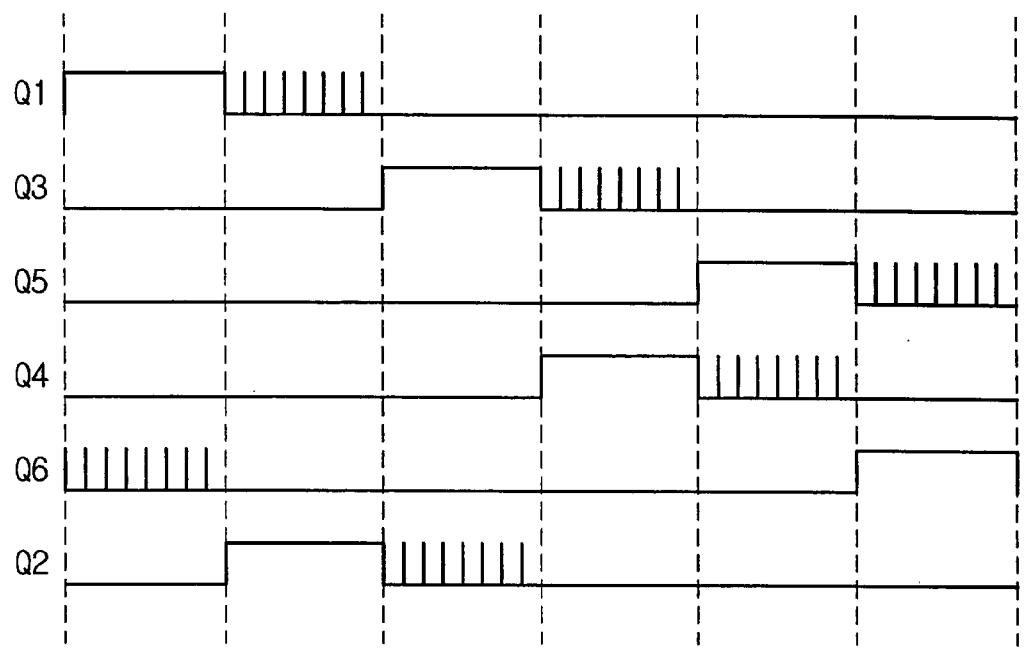
FIG. 7 is a view illustrating a unipolar PWM pattern of a rear stage adapted to the present invention.
Figure 8:
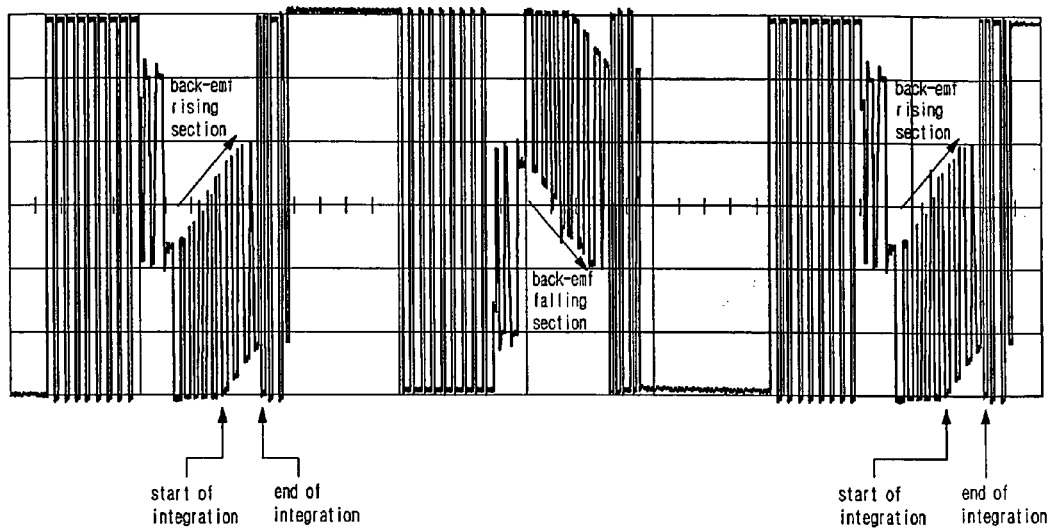
FIG. 8 is a view illustrating a lead voltage of a BLDC motor when using the unipolar PWM pattern of the rear stage of FIG. 7.

FIG. 7 is a view illustrating a unipolar PWM pattern of a rear stage, applied to the present invention, and FIG. 8 is a view illustrating a lead voltage of a BLDC motor when using the unipolar PWM pattern of the rear stage of FIG. 7.

As shown in FIG. 8, when a unipolar PWM pattern of the rear part is used, a rising interval of a back-emf e of a phase to which a voltage is not applied (hereinafter referred to as an OFF phase) appears. In such a rising interval, if PWM is in an OFF state, the lead voltage V_off of the OFF phase is acquired by the following equation (1).

$$V\_off = 1.5 \times e \qquad \text{Equation (1)}$$

On the other hand, in a falling interval wherein the back-emf e decreases in the OFF phase, the lead voltage of the OFF phase is acquired by the following equations (2) and (3), according to ON/OFF state of the PWM.

$$V\_off = V/2 + e, \text{ for PWM=ON} \qquad \text{Equation (2)}$$

$$V\_off = V + e, \text{ for PWM=OFF} \qquad \text{Equation (3)}$$

where V denotes a magnitude of voltage of a DC lead of the inverter 30.

The lead voltage V_off in the rising interval of the back-emf e is smaller than that in the falling interval of the back-emf e.

As expressed in equation (1), it is appreciated that the lead voltage V_off is 1.5 times the back-emf e in the OFF phase with respect to '0' voltage. On the other hand, in the falling interval of the back-emf e, back-emf information is shown from the lead voltage of the OFF phase with respect to V/2 or V.

Therefore, when the resistance dividing circuit, formed by R1 and R2, is adjusted, in the rising interval of the back-emf e, such that the lead voltage V_off can be included in the A/D input range of the controlling unit 70, signals transmitted to the A/D input ports 72 include signals of the back-emf, which is included in the lead voltage V_off, while the signals of the back-emf is not largely attenuated.

On the other hand, when the resistance dividing circuit, formed by R1 and R2, is adjusted, in the rising interval of the back-emf e, such that the lead voltage V_off can be included in the A/D input range of the controlling unit 70, signals transmitted to the A/D input port 72 includes the signals of the back-emf, which are included in the lead voltage V_off, while the signals of the back-emf are largely attenuated.

When the BLDC motor 40 is operated at a low speed, the value of the back-emf is relatively small.

Therefore, if a unipolar PWM pattern of a rear stage is used, relatively correct information of the back-emf can be detected from the lead voltage of the OFF phase in a rising interval wherein the back-emf of the OFF phase is increased. A system having large load variation at a lower speed, such as a compressor, integrates the back-emf detected from the lead voltage of the OFF phase such that a relatively correct phase commutation time point can be acquired.

Figure 9:
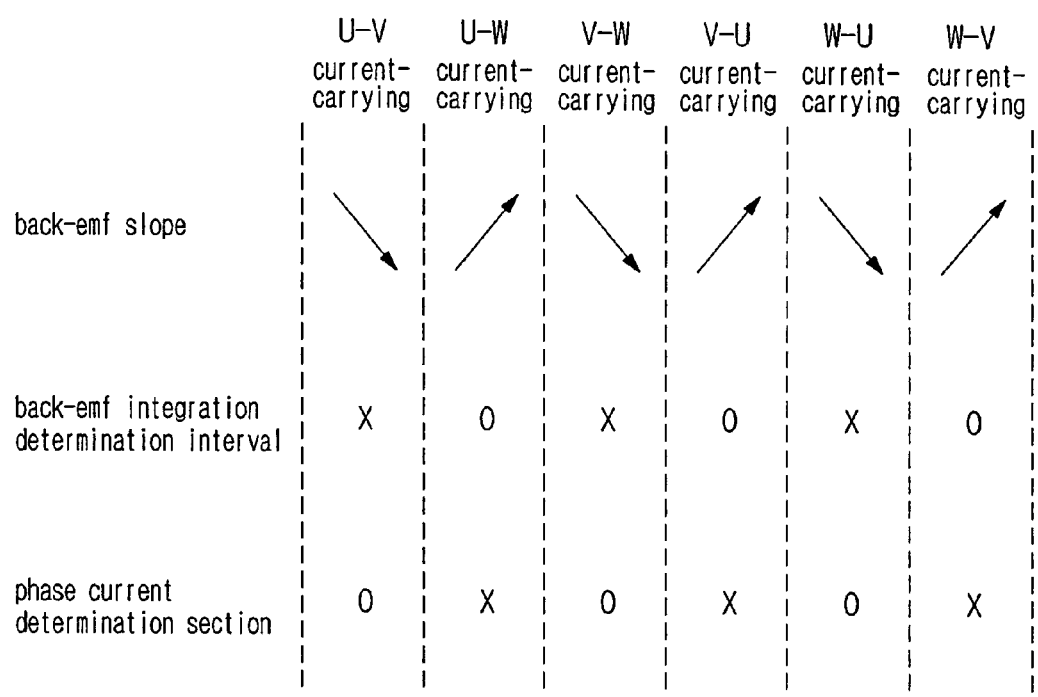
FIG. 9 is a view illustrating states wherein back-emf slopes and references for determining phase commutation time points of OFF phase are shown in current-carrying intervals of a BLDC motor according to the present invention.

FIG. 9 is a view illustrating states wherein back-emf slopes and references for determining phase commutation time points of OFF phase are shown in current-carrying intervals of a BLDC motor according to the present invention. After a slope of the back-emf e is detected, the phase commutation time point is determined in the rising interval of the back-emf e as the back-emf e detected from the lead voltage of the OFF phase is integrated, and the phase commutation time point is determined from the magnitude of the phase current in the falling interval of the back-emf e.

Figure 10:
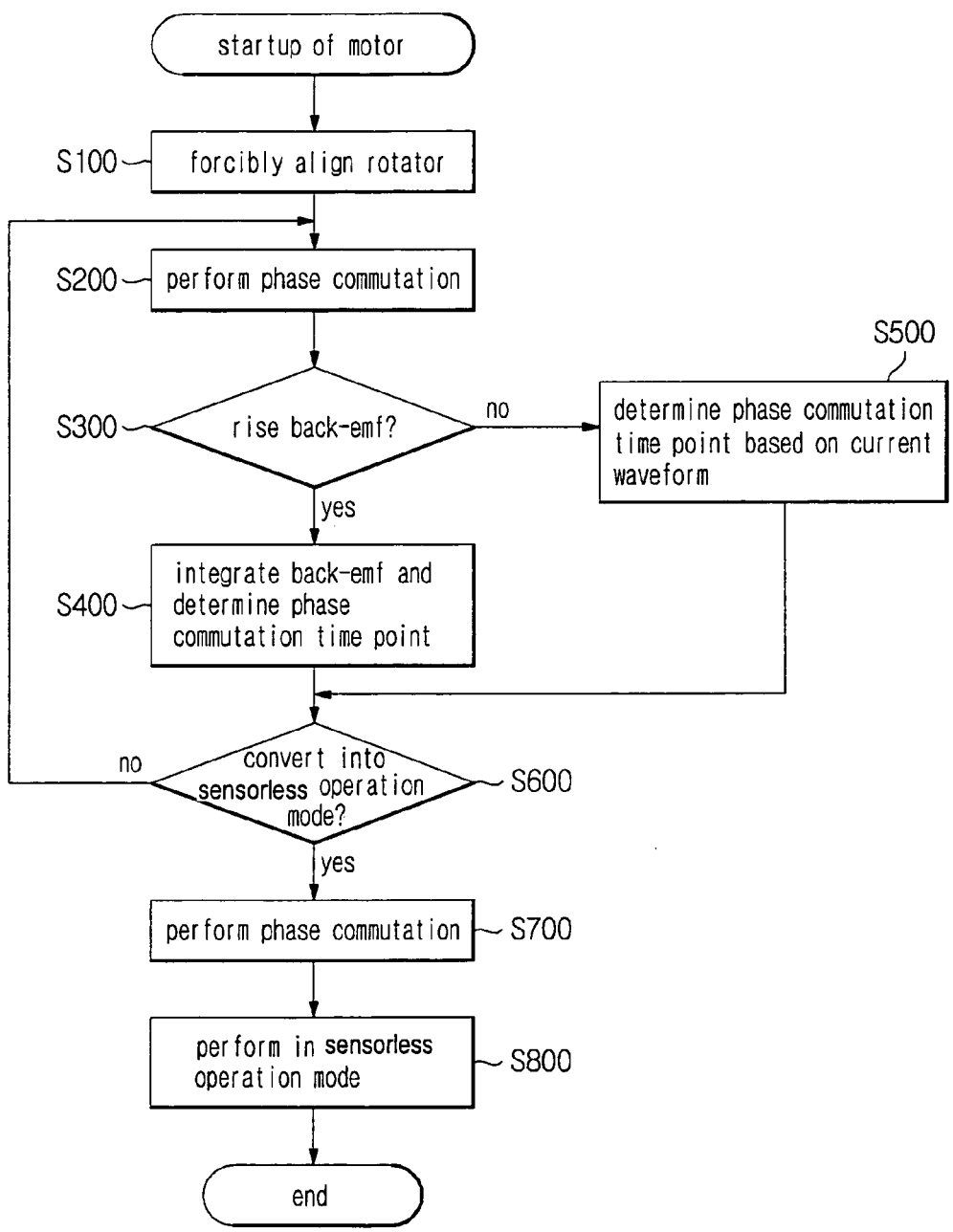
FIG. 10 is a flowchart illustrating a startup control method of a BLDC motor according to the present invention.

FIG. 10 is a flowchart illustrating a startup control method of a BLDC motor according to the present invention. Namely, it shows the method controlling the BLDC motor from at the startup untill at a sensorless operation mode.

As shown in FIG. 10, and with reference to FIG. 3, current is applied to two stator windings of the BLDC motor 40 to forcibly align rotor position in operation 100.

After completing alignment of the rotor position, the voltage and frequency applied to the BLDC motor 40 are varied to perform a synchronous acceleration of the BLDC motor, such that the rotor of the BLDC motor can perform phase commutation while the rotor is accelerated to a predetermined speed in step S200.

For example, if current has been supplied to U-V phase windings to forcibly align the rotor, U-W phase commutation is performed and then current is supplied to U-W phase windings.

When performing phase commutation, a determination is made in operation 300 whether the back-emf of the OFF phase is in a rising interval (see FIG. 8). As shown in FIG. 8, if the back-emf of the OFF phase is in the rising interval, the back-emf is integrated to determine the correct phase commutation time point in step S400.

When performing phase commutation, if the back-emf of the OFF phase is not in the rising interval, as shown in FIG. 6, the correct commutation time point is determined from the phase current waveform in operation 500 of FIG. 10.

After determining a phase time point of the BLDC motor 40, detection is made on whether the back-emf detected from the respective phases of the lead voltages is in a stabilization interval, based on the frequency of the voltage currently applied to the rotor, and then a determination is made on whether the present mode must be converted to a sensorless operation mode in operation 600. If the present mode must not be converted to a sensorless operation mode, the procedure loop is fed back to operation 200 to repeatedly perform phase commutation.

On the other hand, if the present mode must be converted to a sensorless operation mode, phase commutation is performed in operation 700. After that, a sensorless operation mode is performed in operation 800, wherein the senseless operation mode detects a zero crossing point (ZCP) of the back-emf from the lead voltage of the respective phases, and controls phase commutation and rotation speed of the BLDC motor 40, based on detected information of the ZCP.

Figure 11:
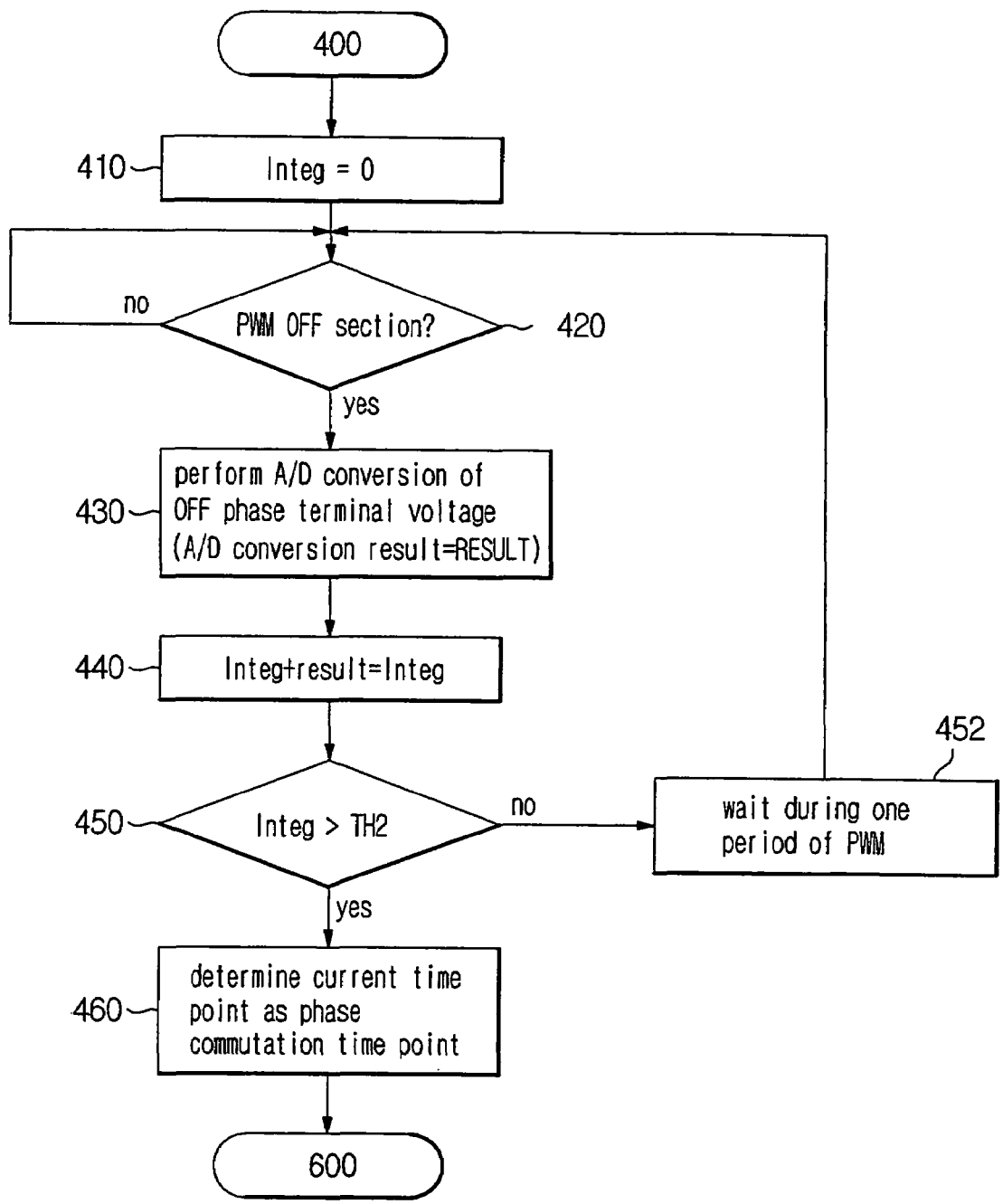
FIG. 11 is a flowchart illustrating a procedure for determining phase commutation time points based on integration of the back-emf of FIG. 10.

With reference to FIG. 11, a procedure for determining phase commutation time points based on integration of the back-emf of FIG. 10 is described in detail below.

As shown in FIG. 11, if the back-emf is in the rising interval, an integral variable INTEG is set to '0' in operation 400. After that, a determination is made whether PWM is performed in an OFF interval in operation 420.

If PWM is performed in an OFF interval, a lead voltage signal of OFF phase, passed through the resistance dividing circuit composed of R1 and R2, is inputted from an A/D input port 72 of the controlling unit 70 to perform an A/D conversion in operation 430. After that, the result RESULT of the A/D conversion is added to an integral variable INTEG to reset the integral variable INTEG in operation 440.

The reset integral variable INTEG is compared with a predetermined integral level TH2 (which is an integral reference value for determining phase commutation time point). If the integral variable INTEG is greater than the integral level TH2, current time point is determined as a phase commutation time point in operation 460. On the other hand, if the integral variable INTEG is not greater than the integral level TH2, the procedure is fed back to step S420, waiting for one period of PWM, in operation 452.

Figure 12:
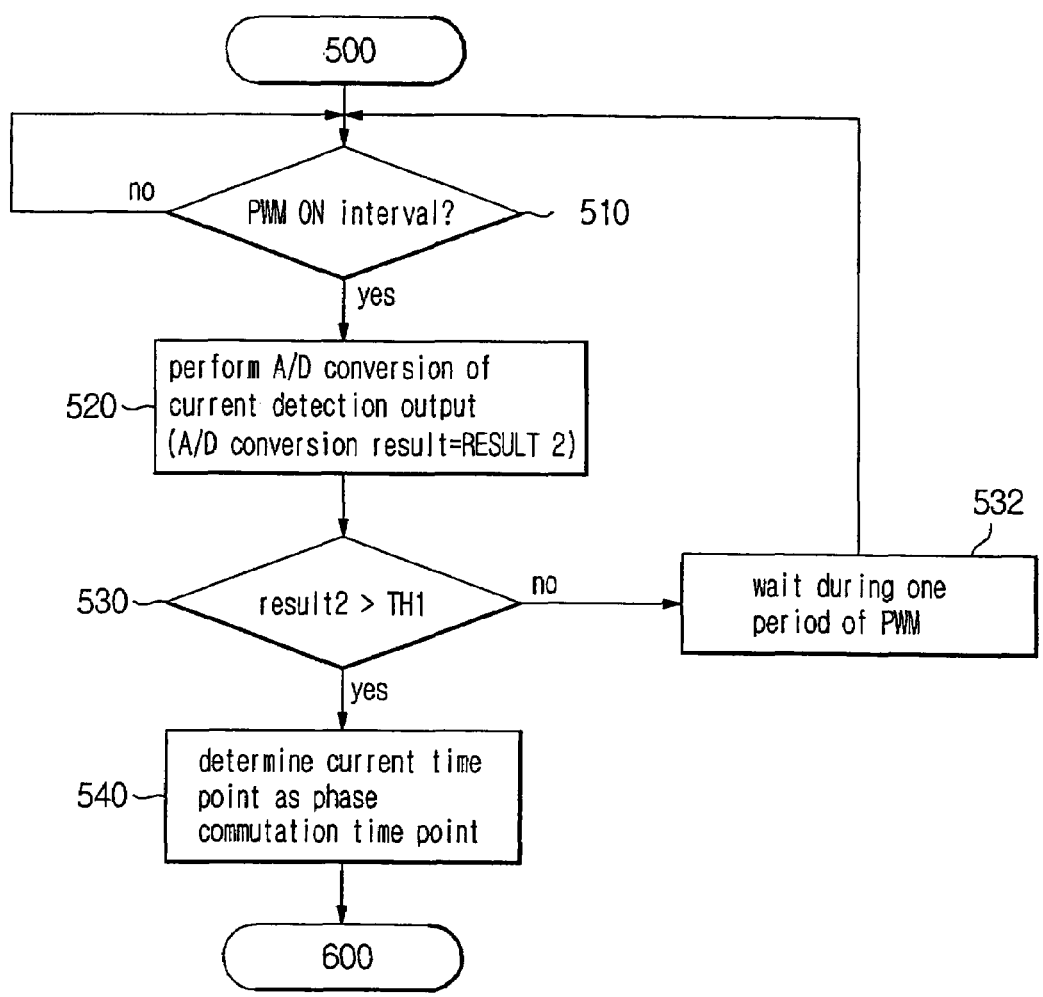
FIG. 12 is a flowchart illustrating a procedure for determining phase commutation time points in a current waveform of FIG. 10.

With reference to FIG. 12, a procedure for determining phase commutation time points in a current waveform of FIG. 10 is described in detail below.

As shown in FIG. 12, if the back-emf is in a falling interval, a determination is made whether PWM is performed in an ON interval in operation 510. If PWM is performed in an ON interval, the current of current-carrying phase detected in the current detection unit 60 is inputted through the A/D input port 72 of the controlling unit 70 and then proceeded based on A/D conversion in operation 520. After that, the current result RESULT 2 of the A/D conversion is compared with a predetermined current level TH1 (which is a current reference value for determining a phase commutation time point) as shown in FIG. 6. If the current result RESULT 2 is greater than the current level TH2, current time point is determined as a phase commutation time point in operation 540. If the current result RESULT 2 is not greater than the current level TH1, a procedure is fed back to operation 510, waiting for one period of PWM, in operation 532.

According to the present invention, the startup control method of a BLDC motor can control the BLDC motor to prevent generation of a transient current such that vibration at the startup stage of the BLDC motor can be reduced, and perform a stable conversion into a sensorless operation mode such that startup failure rate of the BLDC motor can be reduced.

Also, when the BLDC motor of the present invention is applied to compressors in electric appliances, such as refrigerators and air-conditionings, startup noise can be effectively decreased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A startup control method of a brushless direct current (BLDC) motor by commutating a current applied to stator windings according to a rotor position, comprising:

performing phase commutation while the BLDC motor is synchronously accelerated;

detecting back-electromotive force (back-emf) from a lead voltage of a phase to which a voltage does not apply after performing the phase commutation;

determining whether the detected back-emf is in a rising interval, and setting a commutation time point; and converting the commutation time point into a sensorless operation mode if the back-emf detected from the lead voltage is in a stable interval based on a frequency of the voltage applied to the stator windings from the determined phase commutation time point.

2. The method as set forth in claim 1, further comprising:

integrating the lead voltage of the phase to which the voltage does not apply if the back-emf is in the rising interval, and setting a time point that the integration result is greater than a predetermined value as a phase commutation time point.

3. The method as set forth in claim 2, wherein the integration result of the lead voltage is an A/D conversion value of a lead voltage signal of the phase to which the voltage does not apply in a PWM OFF interval.

4. The method as set forth in claim 1, further comprising:

setting a time point that a phase current value is greater than a predetermined value, as a phase commutation time point, if the back-emf is in a falling interval.

5. The method as set forth in claim 4, wherein the phase current value is an A/D conversion value of a current detection signal of current phase in a PWM ON interval.

6. The method as set forth in claim 1, further comprising:

detecting back-emf from the lead voltage of the phase to which the voltage does not apply based on the phase commutation, if the back-emf detected from the lead voltage is not in a stable interval, and returning to the determination of whether the detected back-emf is in the rising interval.

7. The method as set forth in claim 1, wherein the commutation includes:

performing phase commutation;

detecting a zero crossing point (ZCP) of the back-emf from each lead voltage; and performing the sensorless operation mode based on ZCP information, wherein the sensorless operation includes a phase commutation and speed control.

8. The method as set forth in claim 1, further comprising:

supplying current to any two phases of the stator windings, and forcibly aligning the rotor position.

9. A startup control method for controlling startup of a brushless direct current (BLDC) motor by commutating a current applied to stator windings according to a rotor position, comprising:

forcibly aligning the rotor position, and performing phase commutation;

detecting back-electromotive force (back-emf) from a lead voltage of a phase of a voltage which is not applied thereto after performing the phase commutation, and determining whether the detected back-emf is in a rising interval;

integrating the lead voltage of the phase of the voltage which is not applied thereto if the back-emf is in a rising interval, and setting a time point that the integration result is greater than a predetermined value as a phase commutation time point;

setting a time point that a phase current value is greater than a predetermined value as a phase commutation time point if the back-emf is in a falling interval; and converting the commutation time point to a sensorless operation mode if the back-emf detected from the lead voltage is in a stable interval based on a frequency of the voltage applied to the stator windings.

10. A startup control method of a brushless direct current (BLDC) motor by commutating a current applied to stator windings according to a rotor position, comprising:
    detecting back-electromotive force (back-emf) from a lead voltage of a phase of a voltage which is not applied thereto after performing the phase commutation, and determining whether the detected back-emf is in a rising interval;
    setting a time point that a phase current value is greater than a predetermined value as a phase commutation time point if the back-emf is in a falling interval; and
    converting the commutation time point to a sensorless operation mode if the back-emf detected from the lead voltage is in a stable interval based on a frequency of the voltage applied to the stator windings.

11. A startup control method for controlling startup of a brushless direct current (BLDC) motor comprising:
    commutating a current applied to stator windings according to a rotor position;
    forcibly aligning the rotor position and performing phase commutation;
    detecting back-electromotive force (back-emf) from a lead voltage of a phase of a voltage which is not applied thereto after performing the phase commutation, and determining whether the detected back-emf is in a rising interval;
    determining phase commutation time point based on current waveform; and
    converting to a sensorless operation mode if the back-emf detected from the lead voltage is in a stable interval, based on a frequency of the voltage applied to the stator windings.

12. The method as set forth in claim 11, further comprising:
    performing phase commutation;
    detecting a zero crossing point (ZCP) of the back-emf from each lead voltage; and
    performing a sensorless operation mode based on ZCP information, wherein the sensorless operation includes a phase commutation and speed control.

13. A startup control method for controlling startup of a brushless direct current (BLDC) motor by commutating a current applied to stator windings according to a rotor position, comprising:
    performing phase commutation;
    detecting a zero crossing point (ZCP) of the back-emf from each lead voltage; and
    performing a sensorless operation mode based on ZCP information, wherein the sensorless operation includes a phase commutation and speed control.

14. A startup control apparatus comprising:
    a sensorless driving device comprising:
    a rectifying unit to rectify and smooth an AC power supply;
    an inverter to convert the DC power from the rectifying unit into AC power having a plurality of phases;
    a lead voltage detection unit to detect a lead voltage of each of the plurality of phases;
    a current detection unit to detect current of the DC source supplied to the inverter from the rectifying unit;
    a controlling unit to detect a zero crossing point of back-emf according to the lead voltage of the each of the plurality of phases; and
    a PWM signal generation unit to PWM signals based on the output of the controlling unit to supply said PWM signals to the inverter,
    wherein a converting unit converts a commutation time point to a sensorless operation mode if the back-emf detected from the lead voltage is in a stable interval based on a frequency of the voltage applied to the stator windings.

15. The apparatus according to claim 14, wherein the AC power is shaped as a pulse having three-phases with a variable frequency.

* * * * *